United States Patent [19]
Boyan

[11] 3,736,409
[45] May 29, 1973

[54] MANAGEMENT SYSTEM AND METHOD

[75] Inventor: Edwin A. Boyan, Riverside, Calif.

[73] Assignee: Program Control Corporation, Van Nuys, Calif.

[22] Filed: Jan. 11, 1971

[21] Appl. No.: 105,658

Related U.S. Application Data

[63] Continuation of Ser. No. 652,969, July 12, 1967, abandoned.

[52] U.S. Cl..........................235/61.6 R, 340/172.5
[51] Int. Cl.....G05b 15/00, G06f 15/00, G06k 15/00
[58] Field of Search ....................235/61.6 R, 61.6 A, 235/61.6 B, 61.6 H; 340/172.5; 346/10

[56] References Cited

UNITED STATES PATENTS 3,027,219   3/1962   Bradley..................................346/10

OTHER PUBLICATIONS

Stilian et al., "Pert: A New Management Planning and Control Technique," American Management Association, 1962, pp. 17–31, 104 & 105.
"Computers Now Speak with Pictures," Article in Systems Management, Nov. 1962, pp. 30, 31, 33
"Pert: What It Is; What It Can Do For You," Article in Systems Management, July 1962, pp. 42–46
Proceedings of the Discussion on Critical Path Analysis-, Armstrong et al., April 1963, pp. 17–23
IBM Reference Manual, 1401 Data Processing System, Sept. 1961, pages 50, 51
Deller's Walker on Patents, 1964, Baker, Voorhis & Co., Vol. 1 pp. 152, 153

Primary Examiner—Maynard R. Wilbur
Assistant Examiner—Thomas J. Sloyan
Attorney—Golove & Kleinberg

[57] ABSTRACT

A system and process for managing a plurality of operations and activities of diverse characteristics which when completed result in the production of a complex physical system or object. The managing process comprises step procedures and activities, including man-machine procedures, which step procedures may in instances be independent and in others interdependent and may be in part at least partially concurrent in time. The system effectively optimizes the time-relationships and completions of the activities and correlated operations to bring the production of the physical system or object to a conclusion with optimum utilization of time at minimum expense, while during the production period admitting of changes in activites both as to content, operatives involved and time used and timing.

1 Claim, 23 Drawing Figures

INVENTOR
EDWIN A. BOYAN
BY John H. Crowe
AGENT

INVENTOR
EDWIN A. BOYAN
BY  John H. Crowe
AGENT

INVENTOR
EDWIN A. BOYAN
BY John H. Crowe
AGENT

PROGRAM BREAKDOWN STRUCTURE

INVENTOR
EDWIN A. BOYAN
BY: John H. Crowe
AGENT

Patented May 29, 1973

| 1—FIELD: CONVERTER | | DATA FROM: 2 | | | | |
|---|---|---|---|---|---|---|
| NR. K | DESCRIPTION TASK OR ACTIVITY | SPAN TIME | % REQ'D TO START | PRIOR TASK(S) REQ'D | % CONCURR'T | OTHER TASKS OR REQUIREMENTS OUTSIDE THIS FIELD |
| 4—K01 | 3 CONVERTER DRW'GS | 5 7.0 | | 6 | | 7 |
| K02 | 2ND CONVERTER DRW'GS | 2.0 | | K02 | | |
| K03 | GUIDE SECT MOTOR PROC | 20.0 | | K01 K02 | | |
| | EXAMPLE | | | | | |
| 7 | DESIGN MECHANISM | 10 | 30% 100% | 6 4 | 90% | ELECTRONIC DESIGN |

↙ DAYS, WEEKS OR MONTHS

FIG. 6.

INVENTOR
EDWIN A. BOYAN
BY John H. Crowe
AGENT

FIG. 7.

```
G    HAS MULTIPLE TYPE 1,2,OR 4 CARDS
B08  HAS MULTIPLE TYPE 1,2,OR 4 CARDS
B10  HAS MULTIPLE TYPE 1,2,OR 4 CARDS
B13  HAS MULTIPLE TYPE 1,2,OR 4 CARDS
G07  HAS MULTIPLE TYPE 1,2,OR 4 CARDS
G09  HAS MULTIPLE TYPE 1,2,OR 4 CARDS
G12  HAS MULTIPLE TYPE 1,2,OR 4 CARDS
192 TYPE 3 CARDS, 117 PLOT LINES
MORE THAN ONE ACTIVITY  H05
LOOP
  E02
  C06
  E06
  E02
LOOP
  G02
  G01
  F07
  F06
  F03
  E04
 BF04
  H03
  G05
  G04
  G03
  G02
LOOP
  E04
 BF04
  H03
  G05
  G04
  G03
  F05
  F04
  F02
  F01
  C06
  E04
LOOP
  G01
  F07
  F06
  F03

BF04
  H03
  G05
  G04
  G03
  G01
LOOP
  F06
  F03

BF04
  H03
  G05
  G04
  G03
  G01
  F06
PROCESSING TERMINATED
```

FIG. 8

INVENTOR
EDWIN A. BOYAN 083  073
FORMATION DRONE CONTROL PROGRAM          L D MARQUARDT

EARLIEST   LOGICAL   EARLIEST    CONDITIONED   TARGET   TASK         DOPPEL
START      START     COMPLETE    SAFETY                 SUPPORTED

INVENTOR
EDWIN A. BOYAN

FIG. 9b.

| | | | | | | | | | | | |
|---|---|---|---|---|---|---|---|---|---|---|---|
| D007 | 6200 | 100 | D006 | 07400 | 07400 | 13600 | 13600 | 19700 | E015 | 13600 |
| D007 | 6200 | 100 | F003 | 05600 | 05600 | 11800 | | | | |
| D008 | 2200 | 100 | D003 | 08500 | 08500 | 10700 | | | | |
| D008 | 2200 | 100 | F008 | 08900 | 08900 | 11100 | 11100 | 19700 | E015 | 11100 |
| E001 | 2300 | | | 00000 | 00000 | 02300 | 02300 | 06600 | E006 | 02300 |
| E002 | 0000 | 100 | E001 | 02300 | 02300 | 02300 | 02300 | 13300 | E009 | 02300 |
| E003 | 5200 | 100 | E001 | 02300 | 02300 | 07500 | 07500 | 13300 | E009 | 07500 |
| E004 | 5400 | 100 | E001 | 02300 | 02300 | 07700 | 07700 | 13300 | E009 | 07700 |
| E005 | 5400 | 100 | E001 | 02300 | 02300 | 07700 | 07700 | 13300 | E009 | 07700 |
| E006 | 6700 | 100 | E001 | 02300 | 02300 | 09000 | 09000 | 13300 | E013 | 09000 |
| E007 | 700 | 100 | E001 | 02300 | 02300 | 03000 | 03000 | 08800 | E008 | 03000 |
| E008 | 4500 | 100 | E007 | 03000 | 03000 | 07500 | 07500 | 13300 | E009 | 07500 |
| E009 | 0000 | 100 | E002 | 02300 | 02300 | 02300 | | | | |
| E009 | 0000 | 100 | E003 | 07500 | 07500 | 07500 | | | | |
| E009 | 0000 | 100 | E004 | 07700 | 07700 | 07700 | | | | |
| E009 | 0000 | 100 | E005 | 07700 | 07700 | 07700 | 07700 | 13300 | E013 | 07700 |
| E009 | 0000 | 100 | E008 | 07500 | 07500 | 07500 | | | | |
| E010 | 5500 | | | 00000 | 00000 | 05500 | 05500 | 16200 | E011 | 05500 |
| E011 | 1500 | 100 | E010 | 05500 | 05500 | 07000 | 07000 | 17700 | E014 | 07000 |
| E012 | 2200 | 100 | E009 | 07700 | 07700 | 09900 | 09900 | 17700 | E014 | 09900 |
| E012 | 2200 | 100 | E003 | 07500 | 07500 | 09700 | | | | |
| E013 | 4400 | 100 | E009 | 07700 | 07700 | 12100 | | | | |
| E013 | 4400 | 100 | E006 | 09000 | 09000 | 13400 | 13400 | 17700 | E014 | 13400 |
| E014 | 2000 | 100 | E011 | 07000 | 07000 | 09000 | | | | |
| E014 | 2000 | 100 | E012 | 09900 | 09900 | 11900 | | | | |
| E014 | 2000 | 100 | E013 | 13400 | 13400 | 15400 | 15400 | 19700 | E015 | 15400 |
| E015 | 2300 | 100 | E014 | 15400 | 15400 | 17700 | 17700 | 22000 | X001 | 17700 |
| E015 | 2300 | 100 | D005 | 14500 | 14500 | 16800 | | | | |
| E015 | 2300 | 100 | D007 | 13600 | 13600 | 15900 | | | | |
| E015 | 2300 | 100 | D008 | 11100 | 11100 | 13400 | | | | |
| F001 | 2200 | | | 00000 | 00000 | 02200 | 02200 | 07400 | D001 | 02200 |
| F002 | 2000 | 100 | F001 | 02200 | 02200 | 04200 | 04200 | 11000 | F003 | 04200 |
| F003 | 1400 | 100 | F002 | 04200 | 04200 | 05600 | 05600 | 12400 | D006 | 05600 |
| F004 | 0000 | | | 00000 | 00000 | 00000 | | 08600 | F005 | 00000 |
| F005 | 4500 | 100 | F004 | 00000 | 00000 | 04500 | 04500 | 13100 | F006 | 04500 |
| F006 | 3200 | 100 | F005 | 04500 | 04500 | 07700 | 07700 | 16300 | F007 | 07700 |
| F007 | 1200 | 100 | F006 | 07700 | 07700 | 08900 | 08900 | 17500 | F008 | 08900 |
| F008 | 0000 | 100 | F007 | 08900 | 08900 | 08900 | 08900 | 17500 | D008 | 08900 |
| X001 | 0000 | 100 | A013 | 22000 | 22000 | 22000 | 22000 | 22000 | | |
| X001 | 0000 | 100 | E015 | 17700 | 17700 | 17700 | | | | |

| ϕ | ⌐ | ¬ | ⌐⌐ | ▽ | ⊞ | : |
|---|---|---|---|---|---|---|
| EARLIEST START | LOGICAL START | EARLIEST COMPLETE | CONDITION MID SAFETY | TARGET | TASK SUPPORTED | DOPPEL |

INVENTOR
EDWIN A. BOYAN

Fig. 10a

| PROGRAM | | | | |
|---|---|---|---|---|
| ACTIVITY (WORK PACKAGE) | | | RESPONSIBILITY | |
| CLASS | DESCRIPTION | ACTIVITY | DIRECTOR | DEPT. |
| | FIELD OF EFFORT A | | JONES | |
| | ACTIVITY 1 | A1 | | |
| | ACTIVITY 2 | A2 | | |
| | ACTIVITY 3 | A3 | | |
| | ACTIVITY 4 | A4 | | |
| | ACTIVITY 5 | A5 | | |
| | FIELD OF EFFORT B | | SMITH | |
| | ACTIVITY 1 | B1 | | |
| | ACTIVITY 2 | B2 | | |
| | ACTIVITY 3 | B3 | | |
| | ACTIVITY 4 | B4 | | |
| | FIELD OF EFFORT C | | BROWN | |
| | COMBINED ACTIVITY 1 + 2 | C1 | C2 | |
| | ACTIVITY 3 | C3 | | |
| | ACTIVITY 4 | C4 | | |

*INVENTOR*
*EDWIN A. BOYAN*

Patented May 29, 1973　　　　　　　　　　　　　　3,736,409

INVENTOR
EDWIN A. BOYAN

Fig. 10c

| INTERFACE | | | SPAN TIME | | | EFFORT CURVE SKEW | | | | MAINSTREAM RESOUR | | | | | | | | |
|---|---|---|---|---|---|---|---|---|---|---|---|---|---|---|---|---|---|---|
| REQUIRES | CON. | SUPPORTS | APEX 2X | P.S.T. | APEX .5X | | | | | SYSTEM ENG. | | | DESIGN | | | TEST | | |
| Z | ACTIVITY | Z | | | | L | N | S | R | SR | JR | T | SR | JR | T | SR | JR | T |
| | | | | | | | | | | | | | | | | | | |
| | | A3 | | 40 | | | | | | | | | | | | | | |
| 100 | A1 | A4 | | 40 | | | | | | | | | | | | | | |
| 100 | A1 | A4 | | 80 | | | | | | | | | | | | | | |
| 100 | A3 | A5 | | 60 | | | | | | | | | | | | | | |
| 100 | B4 | | | 40 | | | | | | | | | | | | | | |
| | | | | | | | | | | | | | | | | | | |
| | | B2 | | 50 | | | | | | | | | | | | | | |
| 40 | B1 | 20 B3 | | 60 | | | | | | | | | | | | | | |
| 100 | B2 | B4 | | 40 | | | | | | | | | | | | | | |
| 50 | B3 | 60 A5 | | 100 | | | | | | | | | | | | | | |
| | | | | | | | | | | | | | | | | | | |
| 100 | C3 | C4 | | 40 | | | | | | | | | | | | | | |
| 100 | C3 | A5 | | 80 | | | | | | | | | | | | | | |

INVENTOR
EDWIN A. BOYAN

Patented May 29, 1973

| CES | | | | | SUPPORT RESOURCES | | | | DOLLARS (/1K) | |
|---|---|---|---|---|---|---|---|---|---|---|
| MFG ENG. | | FAB. + ASSY. | | | PRG MGT | REL | QAL CON | | LABOR | SERVICE + MATERIAL |
| SR | JR | A | B | C | | | | | | |
| | | | | | | | | | | |
| | | | | | | | | | | |
| | | | | | | | | | | |

INVENTOR
EDWIN A. BOYAN

Fig. 11a.

| ① PROGRAM | | | | |
|---|---|---|---|---|
| ③ ACTIVITY (WORK PACKAGE) ||| ④ RESPONSIBILITY ||
| CLASS | DESCRIPTION | ACTIVITY | DIRECTOR | DEPT. |
| | FIELD OF EFFORT A | | JONES | |
| | ACTIVITY 1 | A1 | | |
| | ACTIVITY 2 | A2 | | |
| | ACTIVITY 3 | A3 | | |
| | ACTIVITY 4 | A4 | | |
| | ACTIVITY 5 | A5 | | |
| | FIELD OF EFFORT B | | SMITH | |
| | ACTIVITY 1 | B1 | | |
| | ACTIVITY 2 | B2 | | |
| | ACTIVITY 3 | B3 | | |
| | ACTIVITY 4 | B4 | | |
| | FIELD OF EFFORT C | | BROWN | |
| | COMBINED ACTIVITY 1 + 2 | C1 | C2 | |
| ⑰ | ACTIVITY 8 ⟶ | C8 | | |
| | ~~ACTIVITY 3~~ | ~~C3~~ | | |
| | ACTIVITY 3A ⟶ | C3A | | |
| | ~~ACTIVITY 4~~ | ~~C4~~ | | |

*INVENTOR*
*EDWIN A. BOYAN*

Fig. 11c.

| INTERFACE | | | SPAN TIME | | | EFFORT CURVE SKEW | | | | | MAINSTREAM RESOUR | | | | | | | | |
|---|---|---|---|---|---|---|---|---|---|---|---|---|---|---|---|---|---|---|---|
| REQUIRES | | | APEX | | APEX | | | | | SYSTEM ENG. | | | DESIGN | | | TEST | | | |
| % | ACTIVITY | CON. % | SUPPORTS | 2X | P.S.T. | .5X | L | N | S | R | SR | JR | T | SR | JR | T | SR | JR | T |
|  |  |  |  |  | 6.0 |  | I | I | I | | 2.0 50I | | 3.0 38 | I | I | | I | I | |
| 50% |  |  | A3 |  | 4.0 |  | I | I | I | | | | | I | I | | I | I | |
| 100 | A1 | 75% | A4 |  | 4.0 |  | I | I | I | | | | | I | I | | I | I | |
| 100 | A1 |  | A4 |  | 8.0 |  | I | I | I | | | | | I | I | | I | I | |
| 100 | A3 |  | A5 |  | 6.0 |  | I | I | I | | | | | I | I | | I | I | |
| 100 | B4 |  |  |  | 4.0 |  | I | I | I | | | | | I | I | | I | I | |
|  |  |  | B2 |  | 5.0 |  | I | I | I | | | | | I | I | | I | I | |
|  | A1 |  |  |  |  |  | | | | | | | | | | | | | |
| 40 | B1 | 20 | B3 |  | 6.0 |  | I | I | I | | | | | I | I | | I | I | |
| 100 | B2 |  | B4 |  | 4.0 |  | I | I | I | | | | | I | I | | I | I | |
| 50 | B3 | 60 | A5 |  | 10.0 |  | I | I | I | | | | | I | I | | I | I | |
|  |  |  |  |  |  | 4.0 | I | I | I | | | | | I | I | | I | I | |
| 100 | C30 |  | C4 |  |  | 6.0 | I | I | I | | | | | I | I | | I | I | |
| 100 | C1 |  | C5 |  |  | 8.0 | I | I | I | | | | | I | I | | I | I | |
| 100 | C3 |  | A5 |  |  |  | | | | | | | | | | | | | |

INVENTOR
EDWIN A. BOYAN

FIG. 11d.

| CES | | | | | SUPPORT RESOURCES | | | | | DOLLARS (/1K) | |
|---|---|---|---|---|---|---|---|---|---|---|---|
| MFG ENG. | | FAB. + ASSY. | | | PRG MGT | REL | QAL CON | | | LABOR | SERVICE + MATERIAL |
| SR | JR | A | B | C | | | | | | | |
| | | | | | | | | | | | |
| | | | | | | | | | | | |
| | | | | | | | | | | | |
| | | | | | | | | | | | |

INVENTOR
EDWIN A. BOYAN

MANAGEMENT SYSTEM AND METHOD

This is a continuation of the U. S. application Ser. No. 652,969, filed July 12, 1967, now abandoned.

This invention relates to a new and improved system for managing complex activities by combined data-processing and other means.

SUMMARY OF THE INVENTION

The new system of this invention comprises, as steps: (1) the analysis of the entire complex of matters, procedures and activities comprised in the production of the system or object, utilizing a unique program breakdown structure comprising a physical record; (2) formulation of an identification of the major objectives which when attained comprise completion of production of the object or system (the latter hereinafter termed the product in the interest of brevity); (3) quantifying data and organizing it into a form acceptable as machine input data; (4) subdividing the major objectives into subsidiary objectives, and identifying and defining the specific tasks necessary to accomplishment of the individual major and subsidiary objectives; (5) defining individual tasks comprised in the respective activities and estimating the span of time (span time) required for accomplishment of each task in terms of time units (e.g., hours); (6) defining the technical requirements associated with each task in terms of the commencement-time and completion-time relationship with those of the other tasks and activities, assigning an alphanumeric identifier or designation for each described task and establishing an order of dominance of individual tasks relative to others; (7) forming a graphical representation (such as the DATA INPUT FORM depicted in FIG. 6 hereof) on which the noted tasks are listed, the graphical representation or form showing the major objective, or sub-objective, the responsible person or organization assigned to execute the task, in each instance, the alpha-numeric task designation or identifier, the task-time estimate, a description of the task to be performed in each instance, the time relationship to other work-related tasks which must be in part or in entirety completed before the task in question can be commenced, and the identification of the latter task or tasks, if any; (8) converting the data produced on the graphical representation (e.g., the DATA INPUT FORM) into a form acceptable as input data for a data-processing system, as by keypunching cards or tape according to a predetermined format (e.g., that illustrated in FIG. 7), and establishing a file, such as a card file, of such data, including collating related data; (9) identifying possible sources of error in the data input, formulating a machine data-processing procedure for identifying and locating the mentioned errors, and machine processing the data for error detection and identification, using alphanumeric character output and printing a form showing the results of the processing (as indicated, for example, in FIG. 8); (10) correcting any discovered input-data errors by addition to, deletion from, or other alteration of the stored input data; and (11) processing the data stored in the card-file or tape, according to a determined program (such as that outlined in FIG. 13), and machine producing a principal chart depicting the data-processor or machine output (as in the form depicted in FIGS. 10a, 10b, 10c, 10d) by automatic high-speed cathode-ray-tube fiber-optics printing means connected to receive the output of the data processor.

The principal chart provides, by way of characters such as line segments produced within the elongate activity spaces previously indicated, indication of the actual extent of current accomplishment of the several tasks encompassed by each of the activities. The chart also demarks by means of significantly unique characters external to the available alphanumeric characters, such items of interest as (a) the earliest possible time of commencement of a particular task and/or activity, (b) the most logical time of commencement of the latter, (c) the earliest possible time of completion of the same, (d) desirable completion time or "doppel" of that portion of the task or activity that is required by a dependent activity, and (e) the absolute or "target" date or time of completion of the task or activity. The principal chart additionally reveals such items of interest as the names of significant persons involved in production of the product; a product and/or project identifier; equipment involved in the data processing and production activities; supporting resources in terms of personnel, finances and equipment; and costs related to labor, material, services and the like. As deemed requisite or expedient, the input data is repetitively upgraded and up-dated to reflect changes occurring during accomplishment of the objectives of the tasks and activities, and the revised input data then reprocessed to produce successively more accurate principal charts, whereby at any stage of the management procedure each cognizant person concerned may be provided, at a moment's notice, with the current status of the several activities as represented by the currently stored input data.

Briefly, the invention has for a principal object the gross improvement of presently known systems adapted to produce and present in graphical form the instantaneous summation of all desired significant factors involved in management and accomplishment of complex product-production projects, such as, for example, the design and manufacture of a submersible-deployed inter-ocean missile system, or products of lesser complexity such as a single aircraft carrier, or a single telemetry system.

In the design and manufacture of products of the indicated complexity, the value has long been established of charts such as progress charts, showing the current status of various sub-divisions of the total task of producing the product, whereby design tasks, prototype production, labor distribution and utilization, material supply, costs, inspections, deliveries, and other of the myriad details involved may be scheduled, and cognizant personnel advised, so as to provide an optimum accomplishment of a determined objective. In general, such charts have heretofore been manually produced utilizing data and information derived from sources, and revisions made aperiodically (or periodically) as seemed proper or expedient, utilizing such mechanical aids as calculators, drafting machines, office equipment and like means. As is evident, by the time such charts are completed and furnished for analysis, the overall picture of a project may have changed considerably in one or many important respects, whereby accurate analyses and optimum future action might well be impossible of attainment. Further, in such methods of driving to conclusion of a project, various human errors, not immediately discernible or detectable, may occur, whereby future planning and action are less than best.

The present invention utilizes a unique arrangement of man and machines and a unique mode of procedure involving series of steps including machine-handling and processing of data with automatic error-searching and correction, to effect the extremely rapid automatic machine-production of comprehensive information-portraying charts. These charts are produced in their original forms at very high speeds (for example, a rate of production in the order of 600,000 characters per minute) and each is revised or up-dated with current changes in accord with revisions or changes effected in the input data. The latter can be continuously or intermittently revised, and upon entry into the data processor are checked for errors of omission and others subject to spotting in the aforementioned error-discovery routine or check. While simpler organizations of apparatuses and operators according to the invention are contemplated within the scope of the latter, a preferred comprehensive and illustrative organization is hereinafter disclosed in detail, in which organization or system information gained by manual or automatic means is supplied to card-punching means which provides an input data file in the form of punched cards which are interrogated sequentially by card-reader means which translates the data presented by the cards as read to a computer. The computer may be of special-purpose construction but is herein illustrated as a general-purpose computer (for example, an IBM 7094 data processing unit) having input interface and buffer means and similar output auxiliary means, and it, along with a tape-reading auxiliary, processes the input data and provides a storable output in the form of a tape record. The tape record is in turn subjected to reading or play-back in a tape-reader unit whose output is fed to the exemplary plotter or print-out means which automatically prints by photo means a principal chart in accordance with this invention. In those instances wherein storage on tape is unnecessary, the output of the computer unit is fed, via interface means, directly to the plotter.

From the foregoing it will be evident that a principal object of the present invention is to provide a novel system and procedure for managing the diverse operations and complex activities involved in production of a complex product.

Another object of the invention is to provide an improved operative arrangement of human resources and physical means whereby to optimize the cooperative use of mental and manual skills with respect to time, materials and money in producing a complex product.

Other objects, features, and advantages of the invention will become evident in the light of the following detailed description of a preferred comprehensive exemplary system and method according to the invention.

BRIEF DESCRIPTION OF THE DRAWINGS

FIG. 6 is a diagram useful in explaining the invention and depicting a device useful in the acquisition of data.

FIG. 7 is a diagram illustrating a preferred form of device for use in recording data.

FIG. 8 is an exemplary record useful in explaining the invention.

Figure 9A:
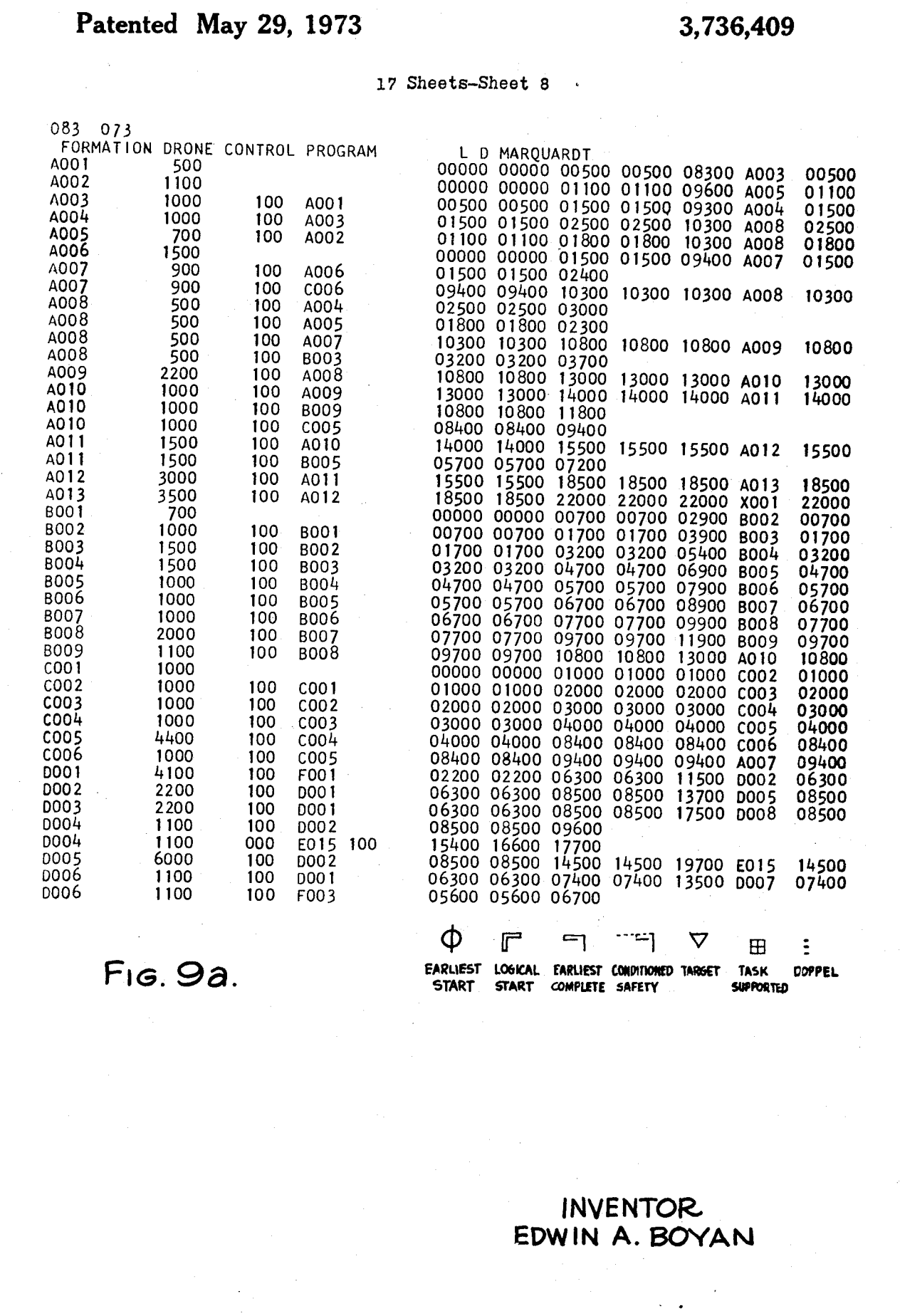

FIGS. 9a and 9b are exemplary records useful in explaining the invention.

FIGS. 11a, 11b, 11c, and 11d are sections of an exemplary principal chart or program produced in the practice of the invention, illustrating in accord with the method of the invention certain progressions from the statuses represented in FIGS. 10a, 10b, 10c, and 10d.

DESCRIPTION OF THE PREFERRED EMBODIMENT

Figure 1:
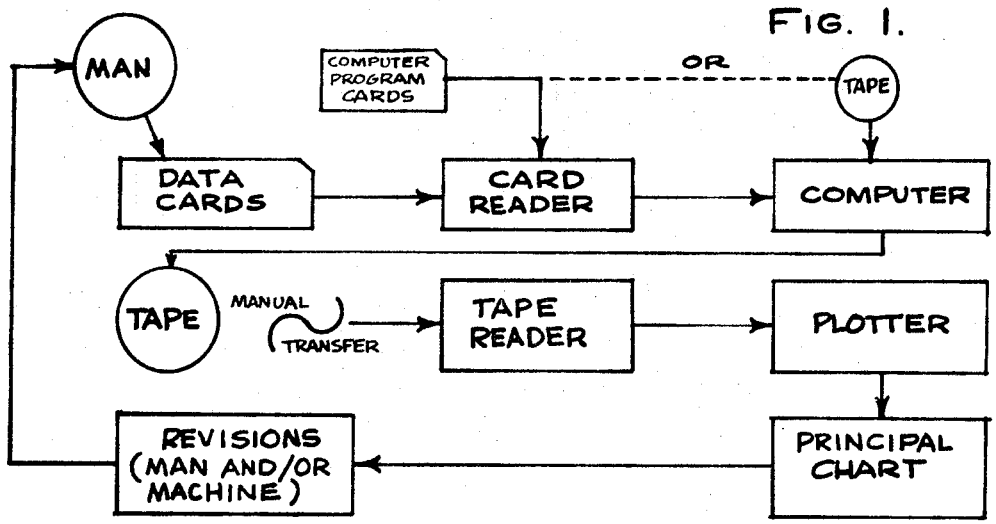
FIG. 1 is a functional schematic diagram showing functional interrelationships of components utilized in an exemplary system in accordance with this invention.

In accord with the requirements of the invention, and as necessitated by the state of the art, definitions of terms herein used are set out in the followng glossary.

Table I

Program Breakdown Structure (PBS). Block diagram of the project, indicating major segments of functional or hardware development within the project, and within each major segment, indicating the objectives or hardware subsystems and components which are integral to that major segment.

Objectives. Statements of purpose which relate to major segments within a PBS, and represent essential accomplishments for overall project completion. Major objectives will be supported by more detailed statements of purpose which are essential accomplishments to support the major objective.

Field of Effort. A homogeneous and logical group of activities which together represent planned activities supporting a single objective. A field of effort is further characterized by close sequential relationships between activities, and by location of responsibility within a single group of personnel or within a specific organizational element.

Acitivity. A single task or operation which can be described as an individual piece of work. An activity must be identified by person or element responsible, requiring a specific period of time for accomplishment, and related to other activities within the field of effort and throughout the project by specific stated requirements for other prior activities.

Span Time. The period of time required to accomplish a given activity, expressed in a common time interval for all activities within the project. Interval may be hours, days, weeks, or months, depending on the length of the project and the required precision for plan operation.

Practical Size Team (PST). An element of data based on the judgement of the individual responsible for a particular activity, and representing the Manequivalents, by types of skills required over the Span Time to accomplish the activity.

Interface. Technical requirements for each activity expressed as degree of completion of prior activities required before the activity can be started.

Earliest Possible Start (Phi). As calculated by the data processing device, the earliest point from the start of the project when the activity can be started.

Logical Start. As calculated by the data processing device, the point in time when, because of technical requirements (interface), it is logical to start the activity.

Earliest Complete. As calculated by the data processing device, the point in time when an activity will be completed, based upon span time required and logical start.

Doppel. A symbl appearing on the principal chart, calculated by the data processing device which represents the latest possible time by which an activity or a portion of an activity must be completed so as not to jeopardize the start of another activity which is being supported.

Target. A symbol appearing on the principal chart which represents the latest point in time an activity can be completed without jeopardizing the overall project end date.

Dominant Interface. A requirement for a predetermined amount of progress is a prior activity, identified by the data processing device calculation known as the pacing activity, which governs the start of the subsequent activity.

According to the invention, man is utilized in conjucntion with machines or apparatuses to produce a result not heretofore conceived nor capable of attainment. A novel procedure or process is utilized; and in explaining the process, its steps, results, and factors involved, reference will be made to a "project" which project is the conception, design, construction and completion of a product. The process begins with analysis of the project with the aid of a device helpful in subdividing a program designed to be followed in attainment of the objective, which is completion of production of the product.

Figure 5:
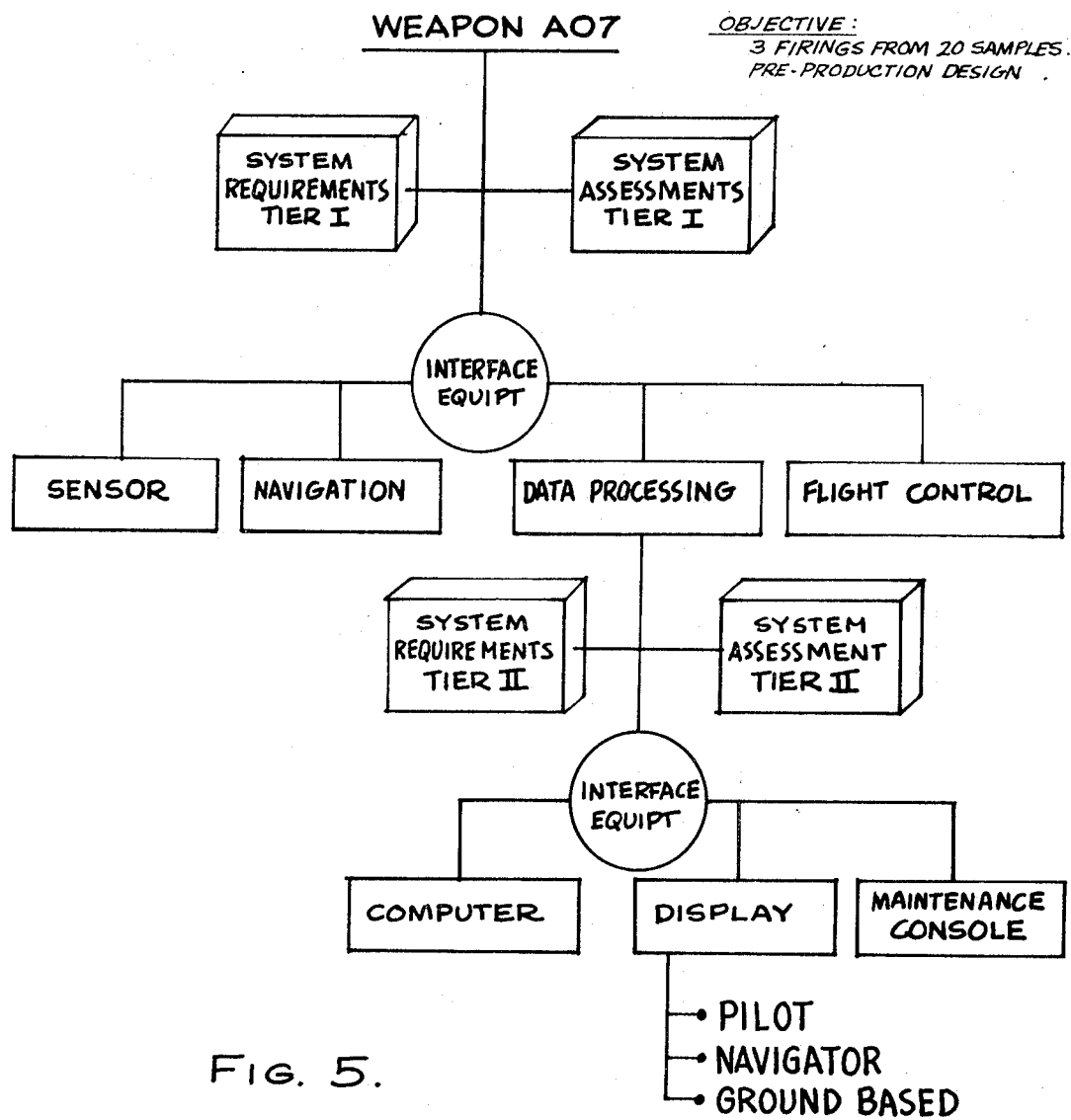
FIG. 5 is a diagram useful in explaining the invention and depicts a preferred exemplary functional breakdown of a program adapted to be utilized in producing a particular product.
Figure 10:
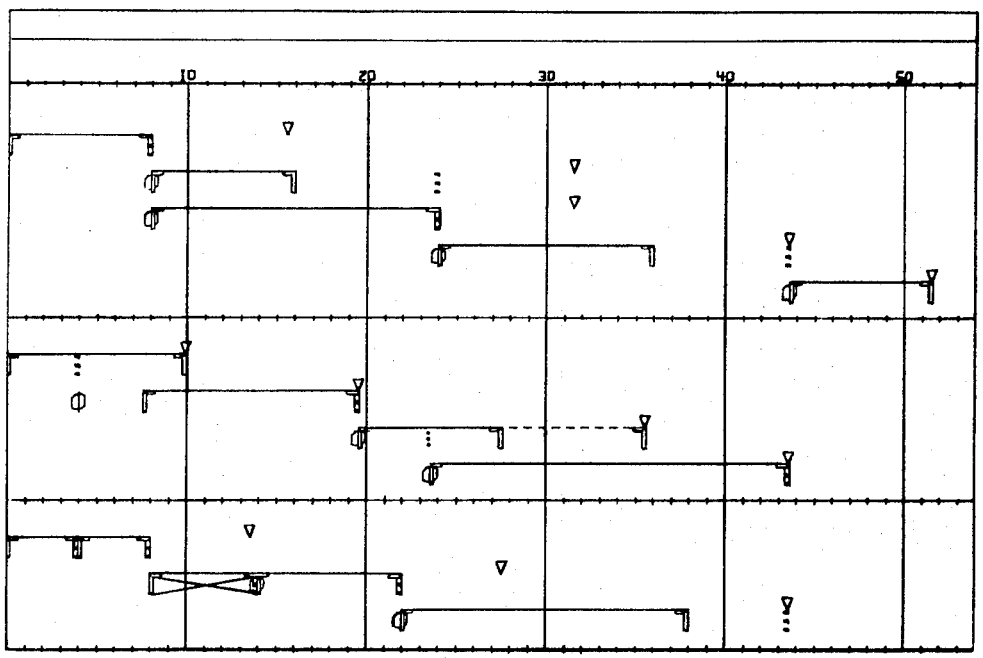
FIGS. 10a, 10b, 10c, and 10d are sections of an exemplary principal chart or program produced in the practice of the invention.
Figure 11B:
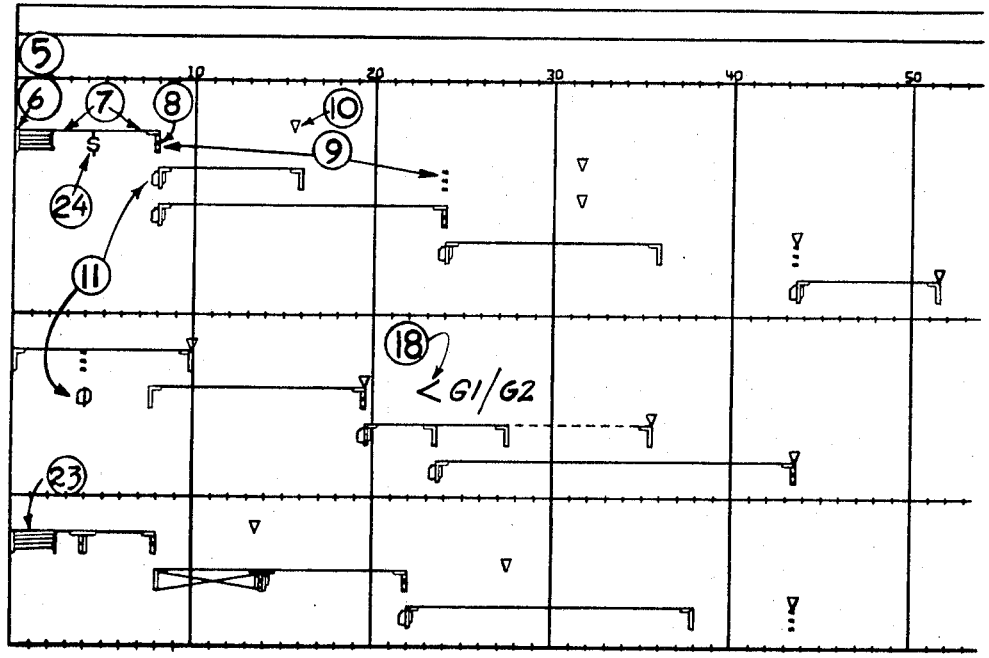

The process begins with analysis of the entire project through the use of a Program Breakdown Structure (FIG. 5) hereinafter abbreviated PBS, wherein the major aspects of the total project are described, and the total of all the tasks required for completion of the project can be attributed to the major divisions of the PBS.

Subsequent to layout of the PBS, the judgement of the project supervisors and the assisting professional advisor is applied to the identification of major objectives and supporting objectives (see Glossary, Table I) which constitute the major aspects of the PBS. These two steps constitute the preliminary systems analysis step in the process, and form the basis for the next step which is the defining, quantifying and organization of data for input to the machine calculation (see Table I).

Within each of the major and sub-objective blocks specific fields of effort and specific tasks are identified. Each of these tasks is characteristically something that must be done to meet one of the objectives of the project; is performed by a specific person or group of persons which can be discretely described; and is further capable of being described as occurring during a specific period of time.

The first step in the development of these data is to describe the individual activities. This is done by the person responsible for a particular objective which the task supports. The next step is to estimate a time period or "span time" in terms of days, weeks, hours, or some other time period which will be required to complete the task. Span time estimates pre-suppose a practical team size (PST). After these two elements of information are developed, the technical requirements are noted for each task. The technical requirement or interface requirement is an expression of the degree or extent to which a task must be completed before a particular activity can be commenced, and is formulated or cited in terms of the other tasks in the project which must be completed before the task being described can be started. To facilitate the referencing of requirements, at the time the brief description of the task is done, it is also given an alphanumeric designation. Although the list of tasks, together with each task's requirements, can be developed in any handscribed format, a Data Input Form (FIG. 6) is available. In using this form, the following steps are followed.

1. In the heading, next to "Data From" there is entered the name of the person listing the tasks or the organizational identification of the activity responsible for the tasks which are to be listed.

2. In the heading, next to "Field" there is entered the major objective or sub-objective from the PBS for which tasks are to be listed.

3. In the column entitled "Description, Task or Activity" there is entered a short description of each of the tasks to be performed.

4. In the column entitled "Nr" there is entered an assigned alphanumeric designation for each task listed.

5. In the column entitled "Span Time" there is entered the number of days, weeks, months required to perform the task.

6. In the column entitled "Prior Task(s) Required" there is entered the number(s) of any tasks which must be completed before the task being described can begin.

In the column entitled "Other Tasks or Requirements Outside this Field" there is entered either a description or an alphanumeric designation of the task required from some other field of work within the project.

At this stage of the procedure no attempt is made to fix the calendar time when a specific task is to be begun or is to be completed. The actual time arrangement of the tasks is a function of the machine calculation portion of the process, and is further refined in subsequent iterative processing in which both man and machine are involved.

The listing of tasks in either any handscribed format or on the exemplary data input form constitutes completion of the first data gathering phase of Plan Generation according to the invention.

Figure 7:
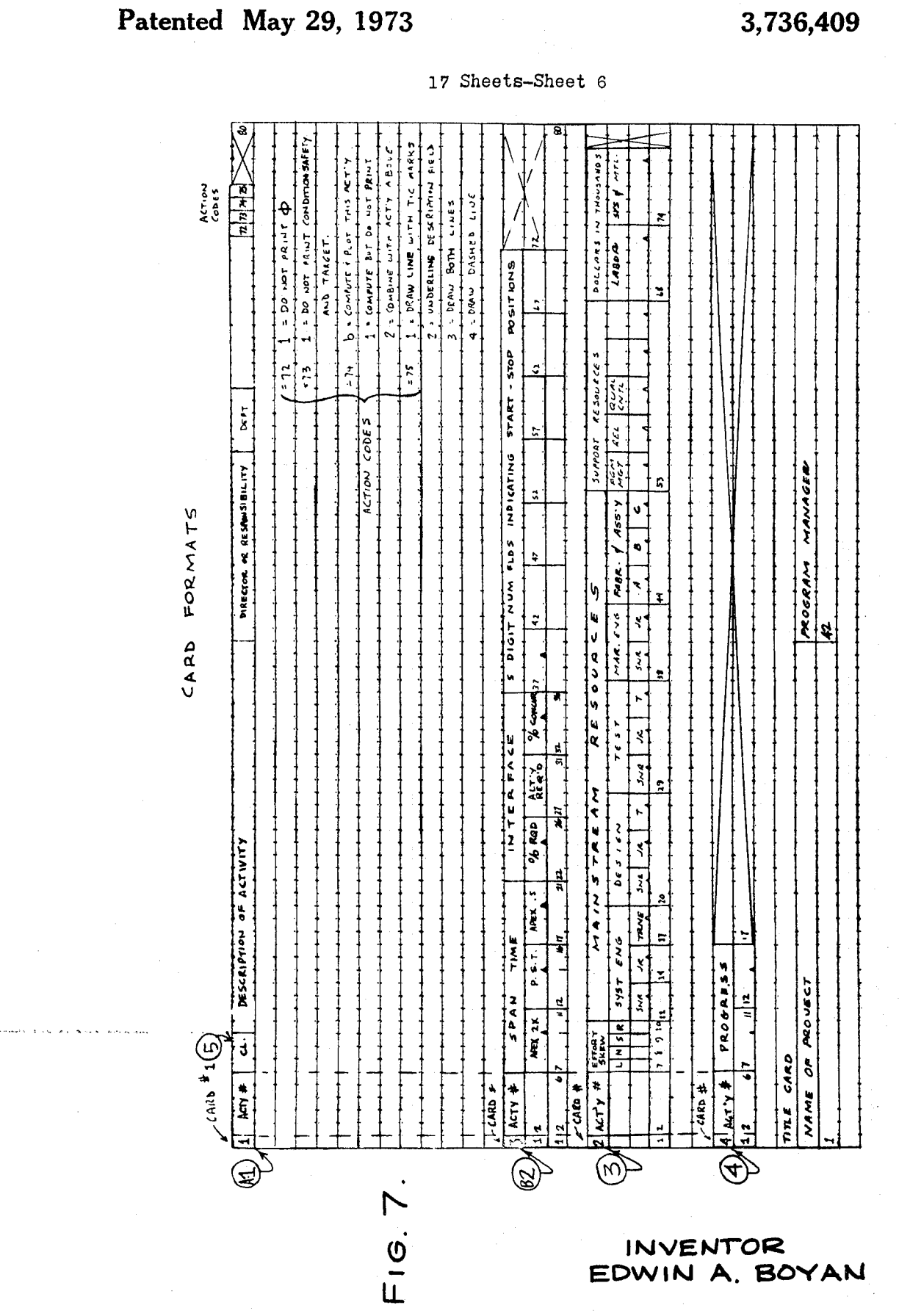

The conversion of the listing of tasks and like data to a format acceptable as input to a data processing device or system is accomplished, for example, by keypunching the data on cards according to a specified format. The format of data in punched card form is illustrated in FIG. 7. Card formats appearing on the latter figure are numbered 1 through 4 in the first column of each of the cards. For purpose of initial Plan Generation only, the title cards and cards numbered 1 and 3 are required.

The title card contains the name of the project and the name of the project manager.

The card numbered 1 is the "activity description" card, and contains the number of the task, a brief description of the activity, and (if provided) the person responsible for the task, and the organizational element wherein the task will be performed as indicated at the number 1 at A in the upper left of FIG. 7.

The card number 3 is the interface card, and contains the task number, the time required to perform the task, and (at this point in plan generation) the number of another task required before this task can be started as indicated at number 2 at B at the left of FIG. 7.

A card numbered 3 is required for each interface.

Allocation is made in each of these cards for the formulation of data being collected, and keypunching is done in a manner which permits the machine to relate and process each of the input cards.

After keypunching of the aforementioned data the completed card deck becomes the basic card or data file for the project. The cards are collated so that each card number 1 is followed by its related cards number 3. This is the machine input to the initial validation and computational processings.

Due to the complex nature of the kinds of projects to which the system is applied, it is possible for several kinds of errors to occur. The most significant of these errors is concerned with missing data and invalid interactivity relationships or requirements.

A machine information-processing procedure has been developed which will identify a condition wherein it is stated that a task requires another task, and in which at least in some instances the task required is not included in the basic input data. The same machine information-processing procedure or step will also identify a condition in the basic input data wherein task requirements are staged in a way which will cause a "loop" to occur. A loop occurs when two or more tasks are inter-related to indicate that each task requires the other in order to start. This error, and the "missing activity" type error are typed out as output from the data-processing device, as illustrated in FIG. 8.

Correction of both of these error conditions requires a re-examination of the basic input. The supervising project advisor then refers to the basic data collection document, and may consult with the person responsible for the field of effort wherein the error is identified, in order to correct the basic input data prior to attempting another data-processing operation through the data processing device.

Figure 2:
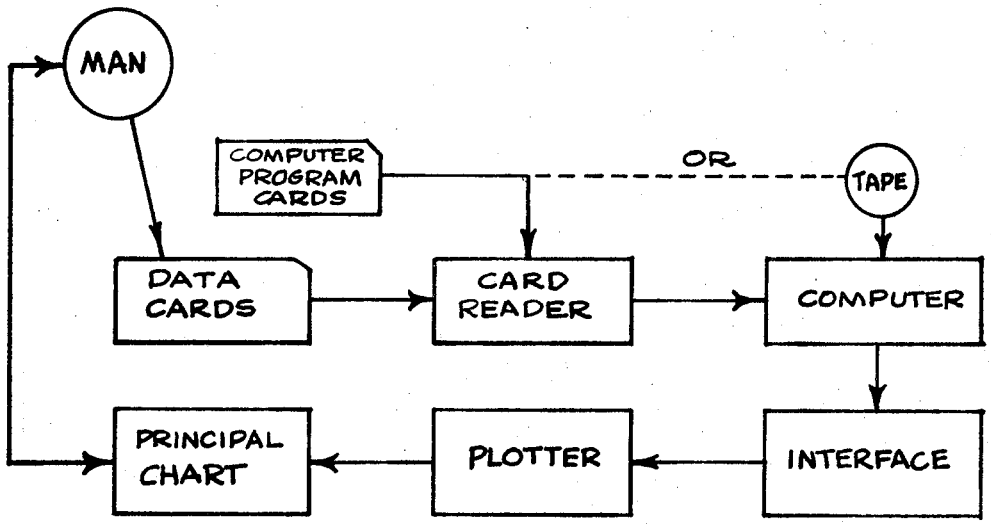
FIG. 2 is a functional diagram similar to FIG. 1, but illustrating a less comprehensive organization of components.
Figure 3:
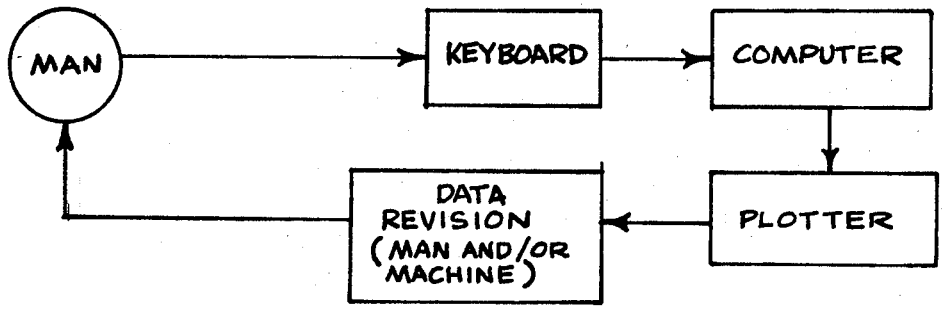
FIG. 3 is a functional diagram similar to FIGS. 1 and 2 but illustrative of a still less comprehensive organization of components.
Figure 4A:
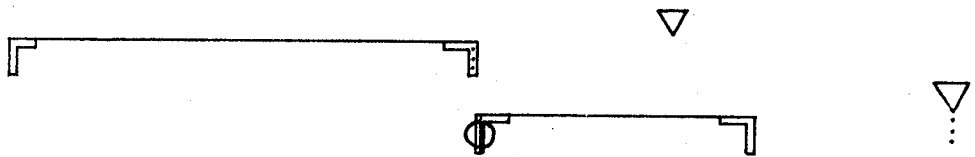
FIGS. 4a, 4b, 4c, 4d, 4e, and 4f are diagrammatic representations useful in explaining the invention and depicting exemplary usages of exemplary arbitrary symbols having special meanings relative to periods of time.
Figure 4B:
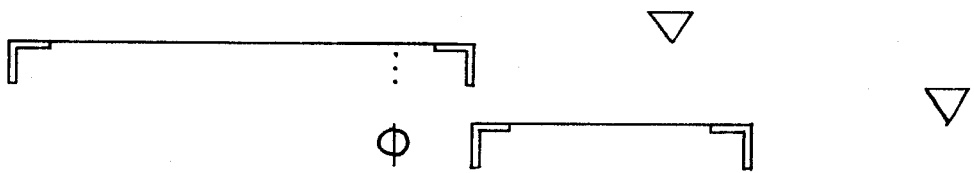
Figure 4C:
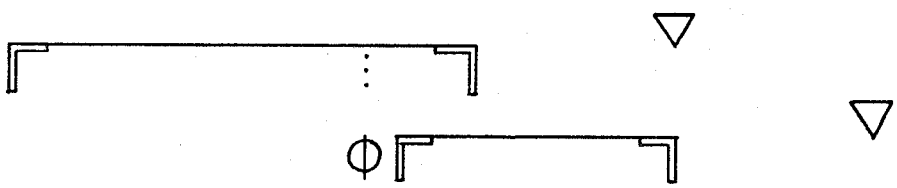
Figure 4D:
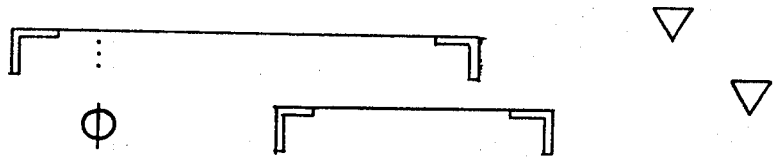
Figure 4E:
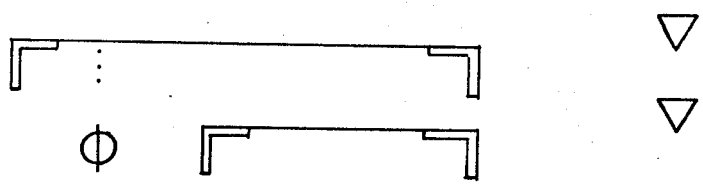
Figure 4F:
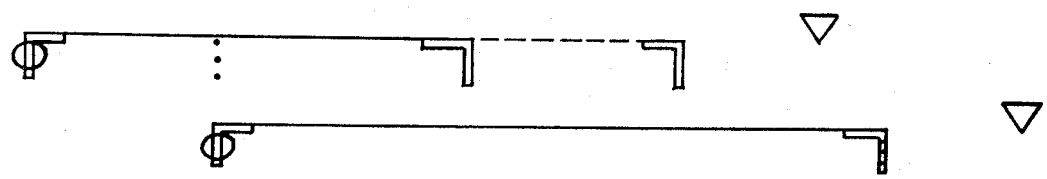

As indicated in FIGS. 1, 2, and 3, after possible errors in the basic data file have been corrected by data addition or correction, the next step in the process involves the computation of the information required for formation of the principal chart depicting the overall project. This is done by the data-processing device or system. Based upon the stated requirements for each activity and on the time required to accomplish each of the activities, the computation lays out the entire project, relating each task to the specific period of time within the total project during which it can be done. For each activity or task, the following points in overall project time are identified and designated in alphanumeric or symbolic code, as indicated in Table I and FIGS. 4a–4f and 9a–9b:

a. Earliest Possible Start
b. Logical Start
c. Earliest Complete
d. Conditioned Safety
e. "Doppel"

In addition to these points in time, the output from the data processing device also indentifies, by "Task Number," the requirements for each task, and indicates which of the required tasks is the dominant interfacing requirement (see Table I for definitions).

At the same time that this output is provided, the information-processing device outputs data required to produce the principal chart as exemplified in FIGS. 10a–10d. The principal chart, or "Plot," as exemplified in FIGS. 10a–10d and 11a–11d, is developed on a plotting device utilizing a magnetic tape reader device of an electronic data processing system to interpret the plotting information developed during the computational process. One type of plotting device comprises a high-speed cathode ray tube fiber optic photo-printer means, and is thus capable of printing out any type of pictorial representation, as, for examples, line segments, angles, alphanumeric characters, circled characters, and any type of printable device for which a computer-coded characterization may be developed.

The first Plot generated during the generation of a plan is for purposes of further refinement and arrangement of the basic data file, in order to produce a definitive, realistic and usable portrayal of the overall planning for the total project. The principal chart or Plot becomes a working document at this point, and throughout the plan-generation operation the chart of Plot is the basic input-output document used by the project management personnel and the technical advisor in the refinement process. Interpretation of the principal chart or Plot (FIGS. 11a–11d) is explained as follows, references being made to circled numbers on the drawings.

1. In the heading of the Plot following "Program" the name of the program appears. This comes from the entry of the title card in the basic input.

2. In the heading of the Plot following "Project Manager" the name of the project manager appears. This comes from the entry made in the title card and input with the basic data.

3. In the first column on the left side of the plot, the title "Activity (Work Package)" appears. Data entered on the No. 1 card describing the activity and assigning each activity a number is printed in this column.

4. In the second major column entitled "Responsibility" additional data from the No. 1 card specifying the Director (person responsible for the task) and the department wherein the activity will take place appears.

5. The grid portion of the Plot appears to the right of the Responsibility column. This section of the Plot is a graphic portrayal of the overall time during which the project will be completed. The scale at the top of the grid shows increments which are proportionately related to the Span Time for each of the activities graphically illustrated on the grid. The value of each increment on the grid is established as a ratio to the unit of Span Time at the time the Plot is produced.

6. The Angle open to the right is the symbol for "Logical Start" (see Table I).

7. The horizontal solid line represents the distance in time over which the activity will be performed.

8. The Angle open to the left is the symbol for "Completion of the Activity."

9. The Doppel symbol is a set of three dots arranged vertically on the same line with the activity it is related to. This is the desired date for completion of all or a required portion of the activity to maintain scheduel (see Table I). This symbol may appear within the activity line, at the completion of the activity or later in time than the completion of the activity.

10. The small triangle is the symbol for the "Safety" or target for the activity with which it is associated.

11. The upper case Greek letter Phi ( $\Phi$ ) is the symbol for "Earliest Posible Start." This symbol may appear earlier in time or at the same time as the logical start.

12. The "Interface" column appearing to the right of the time grid contains information originally submitted in the basic data in the No. 3 card. Under "Requires" is the percent of the prior dominant interface requirement (activity) and the number of the activity which is calculated by the data processing device as the dominant interface. Prior to the refinement process, the percentage cited will always be 100 percent. Under the sub-column titled "Support" is the number of the activity being supported by the activity identified under the activity column (3).

13. To the right of the Interface column the Span Time column appears. Data appearing under the sub-column P.S.T. (Practical Size Team) is the estimated time required to perform the activity as cited on the No. 3 card in the basic data input.

The remainder of the data identifications on the Plot will be explained at a later point in the overall process when these data relate to further refinement of the overall plan.

After the first Plot is produced, it is used for refinement of the plan by the application of the following planning techniques.

A. The Concept of Aggregation.— By using the PBS and organizing the subordinate objectives and activities, all the activities required to complete a project have been included. The logical arrangement of activities within a field of work constitutes proper aggregation. It is only after the graphic portrayal is available on the Plot that all factors required for proper aggregation are available to the manager and the technical advisor. The first element for analysis relates to the basic logical sub-group of tasks. In this respect it is necessary to determine a basis for aggregation. This basis may be a close inter-relationship in time between a small group of tasks, or it may be a common objective which that sub-group of tasks supports, and the analysis also must take into consideration the time period over which the sub-group of tasks is performed. The one additional consideration in the aggregation and arrangement of actities relates to ease of reading the final plan. In this regard, the arrangement of activities, and sub-groups of activities, should read across the chart from upper left to lower right.

B. The Concept of Concurrency.— In refining the Plot, it will be noted that the first draft always cites 100 percent of the supporting activity. It is obvious that this is not a realistic situation, and that in many instances only a part of the prior activity is required before another activity can be started. This is referred to herein as concurrency. To indicate a concurrent situation the chart or Plot is used, and notations are made on this initial Plot in order to correct the basic data input.

The Plot will always show in the interface column the dominant requirement supporting the activity being shown. This condition, in turn, will determine the overall time needed to complete the total project. Introducing concurrency into a plan according to this invention will shorten the overall project time. To introduce concurrency, the following procedure is followed: For each activity, reference the dominant interface requirement and determine if all this supporting activity is required before the activity can be started. If something less than 100 percent of the supporting activity is required, this is noted by lining out the 100 percent requirement and entering in red pencil above that entry the percentage of the supporting activity which is required (see circled numeral 14, FIG. 11c). Then, it is necessary to determine the percentage of the activity being examined which can be done concurrently with the required activity. This percentage figure is entered in the sub-column "Concurrency %" appearing under the Interface column on the principal chart or Plot (see circled numeral 15, FIG. 11c).

Further refinement of the noted plan also requires a review of the originally stated span times. In the light of the activities listed, each of the stated span times should be reviewed, and either shortened, lengthened, or verified. Changes are made by lining out the printed span time entry with a red pencil and entering the corrected span time above the entry (see circled numeral 16, FIG. 11c). During this refinement process it may also be necessary to delete, change, or add other activities. This is done by lining out Activity titles and writing the changed entry above in red pencil (see circled numeral 17, FIG. 11c), or by inserting the title, number, span time, and requirements for new activities (see circled numeral 17, FIG. 11c).

A re-examination of interface requirements should be made during the chart refinement process to verify that the interface requirements are valid and that all interface requirements have been included. This is done by annotating the Plot to add interfaces by number on the grid (see reference 18, FIG. 11b) and/or by changing the interface entries by lining out the original entry and making a new entry above in red pencil (see reference 19, FIG. 11c).

The conversion of data entered on the Plot to a form acceptable to the data processing apparatus and mode portion of the procedure requires correction of the original input data. This is done by a trained technical coder. The coder references annotations made on the Plot and keypunches new cards to reflect or include these annotations. To insure that the appropriate corrections have been made, a listing of the changed input data is prepared and this is compared with the notes on the Plot. After completion of this conversion process, the changed input data is ready for another processing cycle in the data-processing and chart-forming machinery.

The second processing cycle through the data processing system involves the same validation, computation and production of a Plot that the first cycle required, and again the Plot is subject to analysis by the manager and the technical advisor together. This iterative process is repeated as many times as necessary to produce a Plot depicting a plan which satisfies the project manager, and is as clear a portrayal of the plan as the technical advisor can devise. Each iteration follows the same process steps as those described above for the first cycle.

The plan developed and refined as described above and portrayed on the Plot is a definitive portrayal of the real-world situation and, as such, is subject to constant refinement and change as the plan execution progresses. Changes may arise from two main sources. First, additional information is disclosed about the overall job being done; and, second, progress or lack of progress must be portrayed or made evident on the Plot. As additional information becomes available, additional entries are made to more precisely describe the plan. To do this, the Plot is again used as the input document.

Manpower resources are an intergral part of a project plan. These are portrayed on the right side of the Plot (see circled numeral 20, FIGS. 11c–11d). Manpower resources are further delineated by "Mainstream Resources" (see reference number 21, FIG. 11c), and additional detail to reflect skill level may be identified within each of these sub-column heads. Mainstream Resources entries are usually limited to those manpower requirements which are directly concerned with the accomplishment of the activity to which they are attributed. To enter these data into the data-processing and charting system, entries are made in red pencil on the principal chart or Plot in the appropriately titled columns under Mainstream Resources as indicated at reference 22, FIG. 11c. The same procedure is followed in entering the Support Resources. Entries in Support Resources are usually confined to manpower required by the project and identifiable with the project as directly contributing but not a part of the primarily responsible person or activity.

Conversion of manpower data into a form acceptable to the machine segment of the system and process is done by a trained technical coder who punches these entries into the appropriate columns of the No. 2 data input card (see circled numeral 3, FIG. 7). In subsequent processing cycles, these additional punched cards are included in the input data, causing the entries to be included in later versions of the principal chart or Plot.

To portray progress in the novel plan of this invention, an additional entry is made in the input data which results in a graphic portrayal of progress on the Plot in subsequent updated plots. The original notation of technical progress is made on the Plot by the project manager who draws several solid lines in red pencil on the grid within the time portrayed for the activity to represent the percent of work done for that activity (see reference number 23, FIG. 11b). Both technical progress and cost or finance expenditures may be shown for each of the activities portrayed. To indicate the degree of cost or finance expenditures, the manager enters a dollar sign ($) at the point within the time line shown for the activity representing the percentage of dollars expended. For example, if the $ symbol appears midway between the start and complete symbols of an activity, it indicates that 50 percent of the dollars allocated to that activity have been expended (see reference number 24, FIG. 11b).

Conversion of these data for the following machine or information processing step in the process is done by the technical coder who calculates the number of span units represented by the manager's annotations and punches these data into the appropriate columns in the No. 4 input card (see circled reference number 4, FIG. 7).

The entry of progress and the change of progress notations on the Plot may be done at any desired degree of frequency, depending on the span time increment, the volume of work being done, and the criticality of the work being done at any point during the execution of the plan.

Human facilities or personnel (MAN) involved in the plan and procedure according to this invention are, in the example, principally the following.

a. Program Director.—An engineer/scientist responsible for a program from the beginning as basic research and investigation, through the problem definition stages, and continuing throughout the research and development phases to prototype production.

b. Project Manager.—Subordinate to the Program Director, and an engineer/scientist responsible for major segments in any of the phases of the total program.

c. Technical Advisor.—An engineer/scientist counterpart having knowledge of all aspects of program accomplishment, and skilled in the accomplishment of plans according to this invention, able to constructively contribute to program management through knowledge of the program requirements and the application of technology.

d. Technical Coder.—A person having intimate knowledge of the machine segment of the process and apparatus according to this invention and of the requirements for mechanized data forms, who understands the input and output processing techniques of the system and has sufficient knowledge of the type of data being processed to identify possible error situations.

The detailed steps of the procedure are, then, in summary, principally as set out in Table II following, in outline form:

TABLE II

1. A keypunch operator prepares punched cards of the data for a plan or plot, or directly inserts the data with an editorial directive for each of:
   Activity work package
   Responsibility
   Interface
   Span Time
   Effort curve skewness
   Mainstream resources
   Support resources
   Dollars The interface data and span times are used by the computer to calculate the schedule of activities.
   Interface data:
      Required activity number
      % of completion of required activity before start
      % of concurrency
   An activity may have several sets of interface data.

2. The data cards according to FIG. 7 are read into the computer.

3. The computer scans the input data looking for activities required by the interface data. If there are missing activities, a listing of the missing activities is produced by the computer, and then the computer will stop.

4. The computer now calculates Φ (earliest possible start), L/S (logical start), and L/C (logical complete) for each interface. Calculations are made starting at the beginning of the project and working toward the end of the project, relative to real time. When an activity requires another activity that has several interfaces, information from the interface with the largest calculated value of L/C is to be used (dominant interface).

Note that:

Φ equals L/S (of the required activity) plus percent of completion before starting, multiplied by the span time of the required activity.

L/S equals L/C of the required activity minus percent of concurrency multiplied by the span time.

Let K be the value of an intermediate calculation to be used later.

K equals Φ minus L/S if Φ is greater than L/S.

K equals zero if Φ is less than or equal to L/S.

If L/S is less than Φ, replace the calculated value of L/S with the calculated value of Φ.

L/C equals L/S plus the span time.

5. The absence of calculated values for Φ, L/S and L/C for activities indicates loops involving those activities. If there are loops, the computer will produce a listing of the loops, and then the computer will stop.

6. The computer scans the computed data to find the largest value of L/C. The activity with the largest value of L/C is the last activity to be completed in the project, and the project complete time is equal to L/C.

7. The computer places a zero in the ∇ (target) delta and a zero in the C/S (conditional safety) delta of dominant interface of activity with the largest L/C. Now working backwards from this point to the dominant required interfaces, the computer places zero plus the K (computed earlier with Φ, L/S, L/C) from the supported activity, in the ∇ delta and zero in the C/S delta. Continuing working back until an activity is reached that does not have an interface to another activity.

The computer now works backwards, starting at the nondominant interfaces but going to dominant interfaces in the first backward move. The C/S delta is equal to L/C of the dominant interface minus the L/C of the nondominant interface plus the ∇ delta of the dominant interface. The ∇ delta is equal to the above C/S delta plus the K of the supported activity interface. When the backward move goes to an activity that already has a delta, the smallest delta is used. The activity contributing the smallest delta is the dominant supported activity. The Φ of the dominant supported activity is retained and is called the Doppel.

When all of the backwards moves have been made the ∇, C/S and Net Safety values are calculated.

Note that:

∇ equals L/C plus ∇ delta.
C/S equals ∇ minus C/S delta.
Net safety equals ∇ minus status minus span time plus progress.

8. The computer outputs the processed data directly or via interface (storage, etc.) means to the plotter, which translates the coded data computer output signals into cathode-ray tube input signals which are effective via fiber optics means of the plotter to produce, photographically, a principal chart or Plot.

The foregoing detailed description and elucidation of a preferred exemplary system or arrangement of physical facilities including machines (MACHINE) and personnel (MAN) in a closed-loop operative system, and of the details of novel procedures utilizing the physical facilities, indicates complete attainment of the aforementioned objectives. In the light of the disclosures, it is evident that changes within the true spirit and scope of this invention will occur to persons skilled in the art and hence it is not desired that the invention be restricted to the exemplary physical facilities and/or exemplary facilities except as is required by the appended claims.

I claim:

1. A system management method for facilitating production of a product, said method comprising the steps of:

a. forming a chart having an elongate time axis representing passing of time;

b. demarking on said chart in the direction of a second axis, transverse to said time axis, activity identifiers on separate, parallel lines, unconnected with other lines uniquely identifying respective activities involved in production of the product, said activity identifiers being segregated into groups, each demarked by a group identifier, each activity being allocated an elongate area extending across the chart in the direction in the direction of and parallel to the time axis;

c. dividing each such elongate area into a plurality of equal subdivisions representative of respective unit intervals of activity time, and demarking in respective activity times, elongate areas extending across the chart in the direction of and parallel to the time axis representing expected chronological durations of the respective individual activities;

d. demarking on said chart in each said elongate area a distinctive symbol aligned with a corresponding point on said time axis denoting time of commencement of said activities time of completion and a linear interconnection of said distinctive symbols representing duration of said activities, comprised in said procedure and subject to surveillance and change;

e. denoting on said chart in a separate portion of each elongate area the number of time units to be required for individual activities expressed in alphanumeric symbols;

f. forming machine readable file using an information code for recording information required in creating said chart;

g. automatically transforming the coded data recorded in said file into computer input signals, providing said signals as input to an information-processor for operating thereon in accordance with a program to check data for errors and omissions and to produce output signals representative of revised information;

h. translating the said output signals into a series of information signals and concurrently graphically recording the same to produce a corrected replica of said chart;

i. subjecting the recorded information signals as produced on said corrected replica to analysis according to pre-established criteria and altering one or more factors involving one or more of said activities as dictated by the analysis of said corrected replica;

j. revising the information contained in said machine readable file to bring the stored information into conformity with the factural status of said activities; and k. repeating the steps of transforming the coded data, translating, and graphically recording, to produce revised replicas of said chart, whereby management can be guided to effect revisions of the product production activity steps and operations to thereby optimize the production of said product.

* * * * *